United States Patent
Sugahara

(10) Patent No.: US 6,381,274 B1
(45) Date of Patent: Apr. 30, 2002

(54) METHOD AND APPARATUS FOR ENCODING VIDEO SIGNAL

(75) Inventor: Takayuki Sugahara, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/231,827

(22) Filed: Jan. 15, 1999

(30) Foreign Application Priority Data

Jan. 23, 1998 (JP) .......................... 10-011842
Jun. 3, 1998 (JP) .......................... 10-154273

(51) Int. Cl.[7] .............................. H04N 7/12
(52) U.S. Cl. .............................. 375/240.05
(58) Field of Search .......... 375/240.01, 240.03–240.07, 375/240.24, 240.27; H04N 7/12

(56) References Cited

U.S. PATENT DOCUMENTS 5,543,844 A * 8/1996 Mita et al. ................ 375/240.2
5,880,785 A * 3/1999 Fujiwara ................ 375/240.18

FOREIGN PATENT DOCUMENTS

JP 7-226935 8/1995
JP 7-284097 10/1995

OTHER PUBLICATIONS

ISO/IEC JTC1/SC29/WG11, MPEG93/457; Apr., 1993; pp., 61–65.

* cited by examiner

Primary Examiner—Young Lee
(74) Attorney, Agent, or Firm—Connolly Bove, Lodge & Hutz LLP

(57) ABSTRACT

Input picture data represents a succession of pictures each composed of plural blocks. The input picture data is quantized into first quantization-resultant data in response to a fixed quantization width. The first quantization-resultant data is encoded into first code data of a variable length code for every block. Information of an accumulation transition in an amount of the first code data is generated for every block. A code amount accumulation transition value is calculated from the accumulation-transition information and a predetermined target code amount for every block. The predetermined target code amount is defined with respect to every picture. The input picture data is quantized into second quantization-resultant data in response to a variable quantization width. The second quantization-resultant data is encoded into second code data of the variable length code for every block. An actual amount of the second code data is detected for every block. Calculation is made as to an error between the code amount accumulation transition value and the detected actual amount of the second code data for every block. The variable quantization width is controlled in response to the calculated error for every block to maintain an actual amount of the second code data substantially at the target code amount for every picture.

2 Claims, 10 Drawing Sheets

| FIRST → | d00 | d01 | d02 | d03 | d04 | --- | --- --- --- | d0n |
|---|---|---|---|---|---|---|---|---|
| | d10 | d11 | d12 | d13 | d14 | --- | --- --- --- | d1n |
| | ⋮ | ⋮ | ⋮ | ⋮ | ⋮ | ⋮ | ⋮ | ⋮ |
| | dm-1,0 | dm-1,1 | dm-1,2 | dm-1,3 | dm-1,4 | --- | --- --- --- | dm-1,n |
| SECOND → | dm0 | dm1 | dm2 | dm3 | dm4 | --- | --- --- --- | dmn |
| | ⋮ | ⋮ | ⋮ | ⋮ | ⋮ | ⋮ | ⋮ | ⋮ |
| | dk0 | dk1 | dk2 | dk3 | dk4 | --- | --- --- --- | dkn |

METHOD AND APPARATUS FOR ENCODING VIDEO SIGNAL

BACKGROUND OF THE INVENTION

1. Field of the Invention

This invention relates to a method of encoding a video signal which includes a quantization step. This invention also relates to an apparatus for encoding a video signal which uses a quantization process.

2. Description of the Related Art

Japanese published unexamined patent application 7-284097 discloses an apparatus for encoding a video signal which uses a quantization process. The apparatus of Japanese application 7-284097 divides an input video signal into time segments corresponding to equal intervals respectively, and implements signal processing on an interval-by-interval basis.

In more detail, the apparatus of Japanese application 7-284097 has first and second paths along which a same input video signal is transmitted while being processed. A first encoding circuit in the first path encodes the video signal for every interval. The encoding by the first encoding circuit includes quantization using a fixed quantization width. Information of the amount D1 of encoding-resultant data generated by the first encoding circuit for every interval is stored into a memory circuit in the first path. The information of the data amount (the actual data amount) D1 is transmitted from the memory circuit to a target data amount setting circuit. The target data amount setting circuit determines a target data amount D2 for every interval on the basis of the actual data amount D1 by referring to the following equation.

$$D2 = D1 \cdot DALL / \Sigma D1$$

where DALL denotes the total amount of data corresponding to the video signal, and $\Sigma D1$ denotes the summation of the actual data amounts D1 for all the intervals.

In the apparatus of Japanese application 7-284097, a second encoding circuit in the second path encodes the video signal for every interval. The encoding by the second encoding circuit includes quantization responsive to a variable quantization width. Generally, as the quantization width increases, the amount D3 of encoding-resultant data generated by the second encoding circuit for every interval decreases. A first total data amount detection circuit connected to the second encoding circuit is informed of the data amount (the actual data amount) D3. The first total data amount detection circuit calculates the summation $\Sigma D3$ of the data amounts (the actual data amounts) D3 for the intervals up to the present interval. A second total data amount detection circuit connected to the target data amount setting circuit is informed of the target data amount D2. The second total data amount detection circuit calculates the summation $\Sigma D2$ of the target data amounts D2 for the intervals up to the present interval.

In the apparatus of Japanese application 7-284097, a comparison circuit is informed of the target total data amount $\Sigma D2$ and the actual total data amount $\Sigma D3$ by the first and second total data amount detection circuits. The comparison circuit compares the total data amounts $\Sigma D2$ and $\Sigma D3$ with each other. The comparison circuit informs a target data amount correction circuit of the comparison result. The target data amount correction circuit corrects the target data amount D2 into a final target data amount in response to the comparison result. The final target data amount is reported to the second encoding circuit from the target data amount setting circuit. The quantization width used by the quantizer in the second encoding circuit is controlled in response to the final target data amount. Accordingly, the amount D3 of encoding-resultant data generated by the second encoding circuit for every interval depends on the final target data amount. The encoding-resultant data generated by the second encoding circuit is used as an apparatus output video signal.

In the apparatus of Japanese application 7-284097, the correction of the target data amount D2 by the target data amount correction circuit is designed to implement the following processes. In the case where the target total data amount $\Sigma D2$ is greater than the actual total data amount $\Sigma D3$, the target data amount D2 is corrected to slightly increase the final target data amount during intervals after the present interval. In the case where the target total data amount $\Sigma D2$ is smaller than the actual total data amount $\Sigma D3$, the target data amount D2 is corrected to slightly decrease the final target data amount during intervals after the present interval. Accordingly, the actual total data amount $\Sigma D3$ is regulated substantially at the target total data amount $\Sigma D2$.

In the apparatus of Japanese application 7-284097, during an interval after the interval for which the amount of data corresponding to the video signal is significantly great, the quantization width used by the second encoding circuit tends to be set to an unduly large value. On the other hand, during an interval after the interval for which the amount of data corresponding to the video signal is significantly small, the quantization width tends to be set to an unduly small value.

SUMMARY OF THE INVENTION

It is a first object of this invention to provide a method of encoding a video signal which can stably control a quantization width during intervals after the interval where the amount of data corresponding to the video signal is significantly great or small.

It is a second object of this invention to provide an apparatus for encoding a video signal which can stably control a quantization width during intervals after the interval where the amount of data corresponding to the video signal is significantly great or small.

A first aspect of this invention provides a method of encoding input picture data representing a succession of pictures each composed of plural blocks. The method comprises the steps of quantizing the input picture data into first quantization-resultant data in response to a fixed quantization width; encoding the first quantization-resultant data into first code data of a variable length code for every block; generating information of an accumulation transition in an amount of the first code data for every block; calculating a code amount accumulation transition value from the accumulation-transition information and a predetermined target code amount for every block, the predetermined target code amount being defined with respect to every picture; quantizing the input picture data into second quantization-resultant data in response to a variable quantization width; encoding the second quantization-resultant data into second code data of the variable length code for every block; detecting an actual amount of the second code data for every block; calculating an error between the code amount accumulation transition value and the detected actual amount of the second code data for every block; and controlling the variable quantization width in response to the calculated error for every block to maintain an actual amount of the second code data substantially at the target code amount for every picture.

A second aspect of this invention provides a method of encoding input picture data representing a succession of frames each divided into plural frame portions. Each of the frame portions is composed of blocks. The method comprises the steps of dividing the input picture data into first division-resultant picture data portions corresponding to the respective frame portions; quantizing the first division-resultant picture data portions into first quantization-resultant data portions in response to a fixed quantization width in parallel; encoding the first quantization-resultant data portions into first code data portions of a variable length code in parallel for every block; generating information of an accumulation transition in an amount of each of the first code data portions for every block; calculating a code amount accumulation transition value from the accumulation-transition information and a predetermined target code amount for every block, the predetermined target code amount being defined with respect to every picture; dividing the input picture data into second division-resultant picture data portions corresponding to the respective frame portions; quantizing the second division-resultant picture data portions into second quantization-resultant data portions in response to variable quantization widths in parallel; encoding the second quantization-resultant data portions into second code data portions of the variable length code in parallel for every block; detecting an actual amount of each of the second code data portions for every block; calculating errors between the code amount accumulation transition value and the detected actual amounts of the second code data portions for every block; and controlling the variable quantization widths in response to the calculated errors for every block to maintain an actual amount of the second code data portions substantially at the target code amount for every picture.

A third aspect of this invention provides a method of encoding first input picture data representing a succession of pictures each composed of plural blocks. The method comprises the steps of quantizing the first input picture data into first quantization-resultant data in response to a fixed quantization width; encoding the first quantization-resultant data into first code data of a variable length code for every block; generating information of an accumulation transition in an amount of the first code data for every block; calculating a code amount accumulation transition value from the accumulation-transition information and a predetermined target code amount for every block, the predetermined target code amount being defined with respect to every picture; delaying the first input picture data into second input picture data by a predetermined time interval corresponding to a given number of successive pictures; quantizing the second input picture data into second quantization-resultant data in response to a variable quantization width; encoding the second quantization-resultant data into second code data of the variable length code for every block; detecting an actual amount of the second code data for every block; calculating an error between the code amount accumulation transition value and the detected actual amount of the second code data for every block; and controlling the variable quantization width in response to the calculated error for every block to maintain an actual amount of the second code data substantially at the target code amount for every picture.

A fourth aspect of this invention is based on the first aspect thereof, and provides a method wherein the accumulation-transition information results from normalization with an amount of the first code data for every picture, and includes data of a difference between amounts of the first code data for two successive bocks, and wherein the code amount accumulation transition value is equal to the target code amount multiplied by a value resulting from normalizing a sum of the differences for blocks up to a last processed block with the amount of the first code data for every picture.

A fifth aspect of this invention provides an apparatus for encoding input picture data representing a succession of pictures each composed of plural blocks. The apparatus comprises means for quantizing the input picture data into first quantization-resultant data in response to a fixed quantization width; means for encoding the first quantization-resultant data into first code data of a variable length code for every block; means for generating information of an accumulation transition in an amount of the first code data for every block; means for calculating a code amount accumulation transition value from the accumulation-transition information and a predetermined target code amount for every block, the predetermined target code amount being defined with respect to every picture; means for quantizing the input picture data into second quantization-resultant data in response to a variable quantization width; means for encoding the second quantization-resultant data into second code data of the variable length code for every block; means for detecting an actual amount of the second code data for every block; means for calculating an error between the code amount accumulation transition value and the detected actual amount of the second code data for every block; and means for controlling the variable quantization width in response to the calculated error for every block to maintain an actual amount of the second code data substantially at the target code amount for every picture.

A sixth aspect of this invention provides an apparatus for encoding input picture data representing a succession of frames each divided into plural frame portions. Each of the frame portions is composed of blocks. The apparatus comprises means for dividing the input picture data into first division-resultant picture data portions corresponding to the respective frame portions; means for quantizing the first division-resultant picture data portions into first quantization-resultant data portions in response to a fixed quantization width in parallel; means for encoding the first quantization-resultant data portions into first code data portions of a variable length code in parallel for every block; means for generating information of an accumulation transition in an amount of each of the first code data portions for every block; means for calculating a code amount accumulation transition value from the accumulation-transition information and a predetermined target code amount for every block, the predetermined target code amount being defined with respect to every picture; means for dividing the input picture data into second division-resultant picture data portions corresponding to the respective frame portions; means for quantizing the second division-resultant picture data portions into second quantization-resultant data portions in response to variable quantization widths in parallel; means for encoding the second quantization-resultant data portions into second code data portions of the variable length code in parallel for every block; means for detecting an actual amount of each of the second code data portions for every block; means for calculating errors between the code amount accumulation transition value and the detected actual amounts of the second code data portions for every block; and means for controlling the variable quantization widths in response to the calculated errors for every block to maintain an actual amount of the second code data portions substantially at the target code amount for every picture.

A seventh aspect of this invention provides an apparatus for encoding first input picture data representing a succession of pictures each composed of plural blocks. The apparatus comprises means for quantizing the first input picture data into first quantization-resultant data in response to a fixed quantization width; means for encoding the first quantization-resultant data into first code data of a variable length code for every block; means for generating information of an accumulation transition in an amount of the first code data for every block; means for calculating a code amount accumulation transition value from the accumulation-transition information and a predetermined target code amount for every block, the predetermined target code amount being defined with respect to every picture; means for delaying the first input picture data into second input picture data by a predetermined time interval corresponding to a given number of successive pictures; means for quantizing the second input picture data into second quantization-resultant data in response to a variable quantization width; means for encoding the second quantization-resultant data into second code data of the variable length code for every block; means for detecting an actual amount of the second code data for every block; means for calculating an error between the code amount accumulation transition value and the detected actual amount of the second code data for every block; and means for controlling the variable quantization width in response to the calculated error for every block to maintain an actual amount of the second code data substantially at the target code amount for every picture.

An eighth aspect of this invention provides an apparatus for encoding first input picture data representing a succession of pictures each composed of plural blocks. The apparatus comprises means for detecting an activity of the first input picture data for every block; means for generating information of an accumulation transition in an amount of the first code data in response to the detected activity for every block; means for calculating a code amount accumulation transition value from the accumulation-transition information and a predetermined target code amount for every block, the predetermined target code amount being defined with respect to every picture; means for delaying the first input picture data into second input picture data by a predetermined time interval corresponding to a given number of successive pictures; means for quantizing the second input picture data into second quantization-resultant data in response to a variable quantization width; means for encoding the second quantization-resultant data into second code data of the variable length code for every block; means for detecting an actual amount of the second code data for every block; means for calculating an error between the code amount accumulation transition value and the detected actual amount of the second code data for every block; and means for controlling the variable quantization width in response to the calculated error for every block to maintain an actual amount of the second code data substantially at the target code amount for every picture.

A ninth aspect of this invention is based on the fifth aspect thereof, and provides an apparatus wherein the accumulation-transition information results from normalization with the amount of the first code data for every picture, and includes data of a difference between amounts of the first code data for two successive bocks, and wherein the code amount accumulation transition value is equal to the target code amount multiplied by a value resulting from normalizing a sum of the differences for blocks up to a last processed block with the amount of the first code data for every picture.

DESCRIPTION OF THE PREFERRED EMBODIMENTS

First Embodiment

Figure 1:
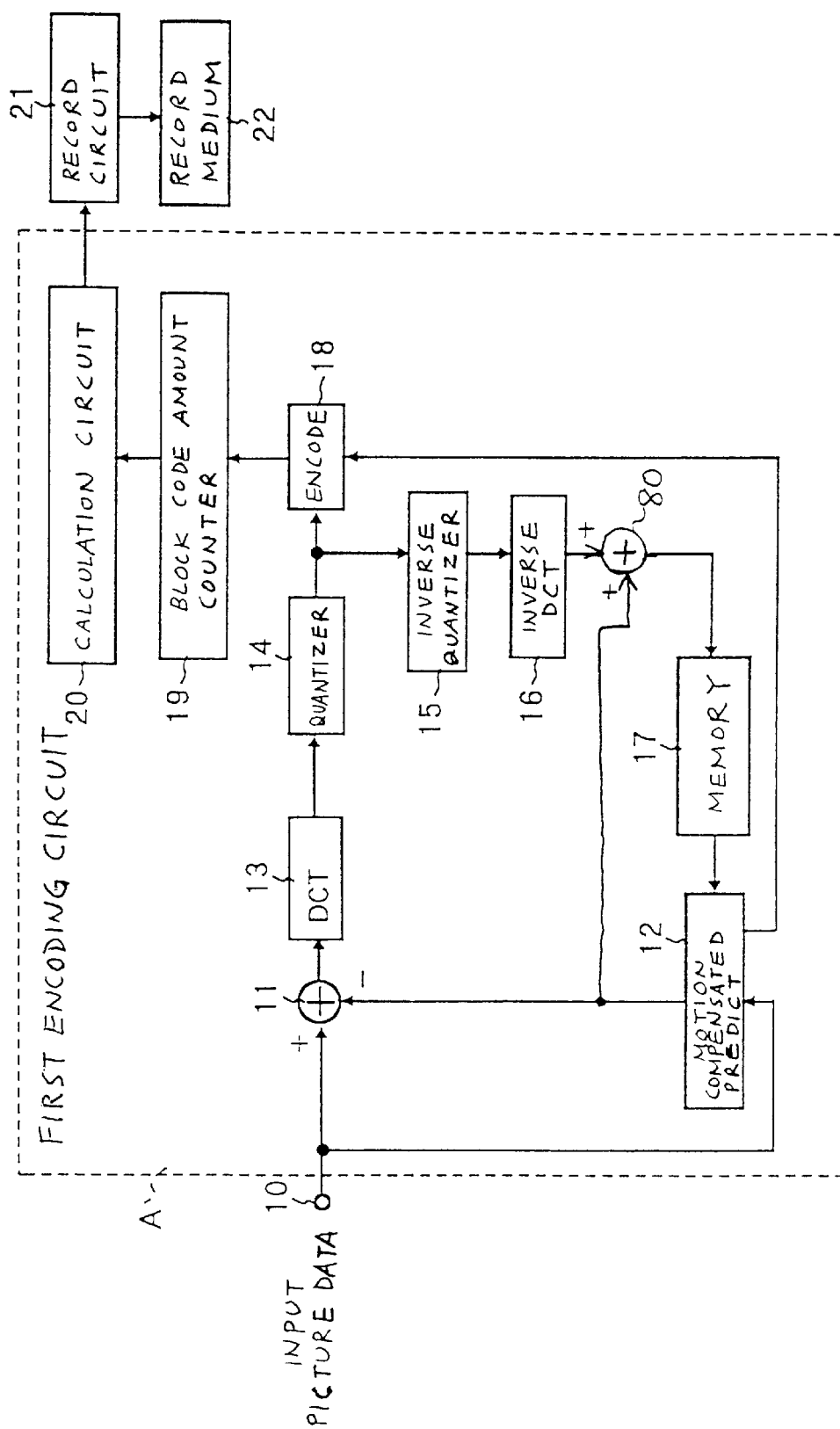
FIG. 1 is a block diagram of a first path of a video signal encoding apparatus according to a first embodiment of this invention.
Figure 2:
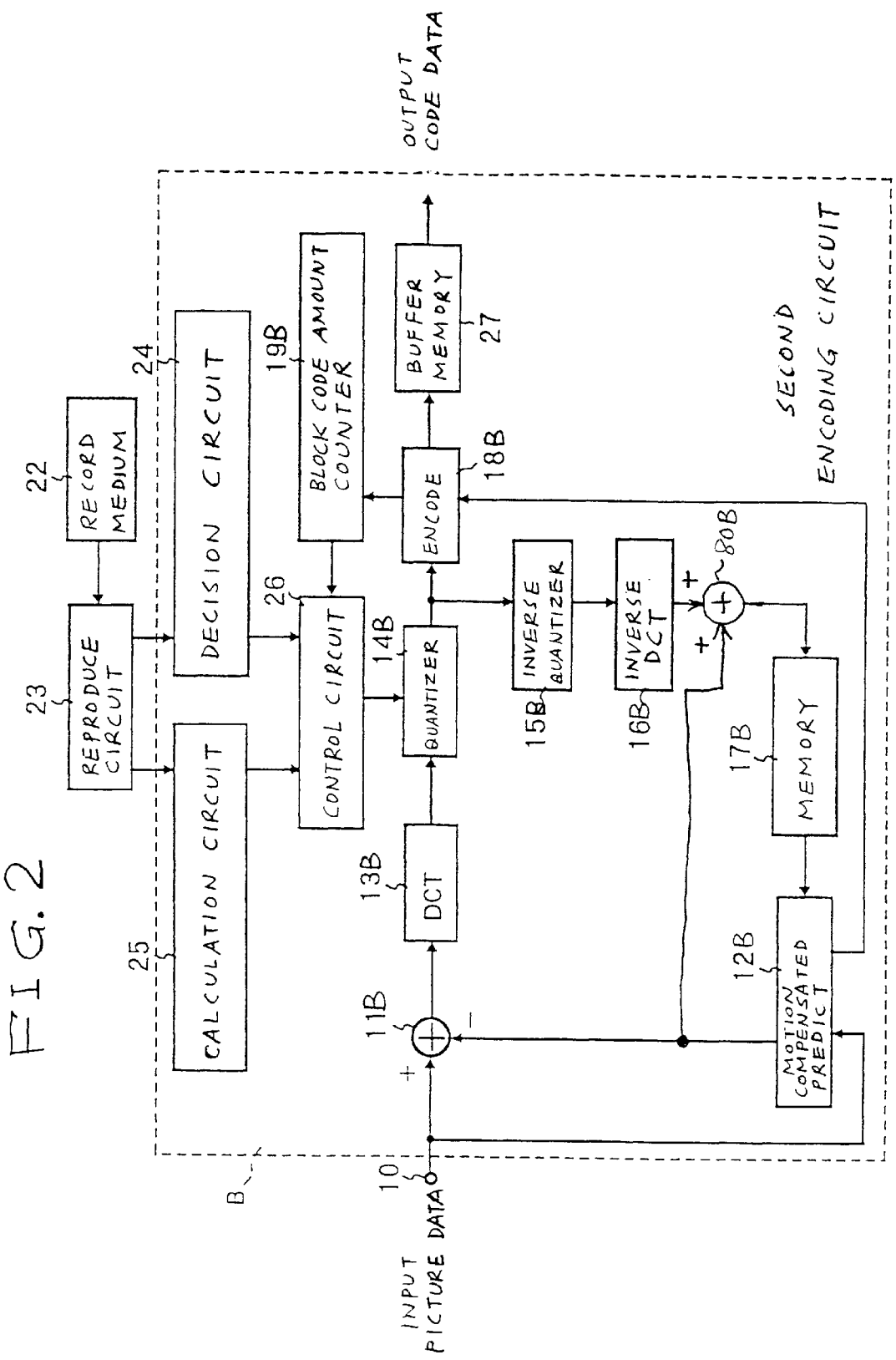
FIG. 2 is a block diagram of a second path of the video signal encoding apparatus according to the first embodiment of this invention.

A video signal encoding apparatus according to a first embodiment of this invention includes a first path and a second path along which an input video signal is transmitted while being processed. The video signal encoding apparatus is designed to implement video signal processing which conforms to the MPEG (Moving Picture Experts Group) standards. Every picture represented by the video signal is divided into blocks. The video signal is processed on a block-by-block basis. FIG. 1 shows the first path of the video signal encoding apparatus. FIG. 2 shows the second path of the video signal encoding apparatus.

An analog video signal composed of a luminance signal and color difference signals is changed into a corresponding digital video signal by an analog-to-digital converter (not shown). Frame-corresponding time segments or field-corresponding time segments of the digital video signal are rearranged according to the types of pictures represented by the signal segments. The rearrangement-resultant digital video signal is transmitted along the first path and the second path of the video signal encoding apparatus while being processed. Specifically, after the rearrangement-resultant digital video signal has been processed in the first path of the video signal encoding apparatus, the rearrangement-resultant digital video signal starts to be processed in the second path of the video signal encoding apparatus in response to the results of the signal processing by the first path thereof.

The first path of the video signal encoding apparatus will be explained hereinafter with reference to FIG. 1. The rearrangement-resultant digital video signal is fed, as input picture data, to a first encoding circuit "A" via an input terminal 10. In the first encoding circuit "A", the input picture data is applied to a subtracter 11 and a motion-compensated predicting device 12. The motion-compensated predicting device 12 outputs motion-compensated predicted picture data to the subtracter 11. The subtracter 11 calculates a difference or an error between the input picture data and the motion-compensated predicted picture data, and generates difference picture data or error picture data representing the calculated difference or error. The subtracter 11 outputs the difference picture data (the error picture data) to a DCT device 13.

The DCT device 13 subjects the difference picture data to discrete cosine transform (DCT) which is a kind of orthogonal transform. The DCT device 13 generates DCT-resultant picture data representing DCT coefficients. The DCT device 13 outputs the DCT-coefficient data to a quantizer 14. The device 14 quantizes the DCT-coefficient data in response to a fixed quantization width. The fixed quantization width is equal to a quantization matrix multiplied by a scalar quantization scale. The quantization matrix has 8 by 8 elements resulting from a process of weighting two-dimensional frequency components according to visual sensation. The quantization includes a step of dividing the DCT coefficients by the quantization width. The quantizer 14 outputs the quantization-resultant picture data to a variable length encoding device (a variable length coding device or a VLC device) 18 and an inverse quantizer 15.

The variable length encoding device 18 converts the quantization-resultant picture data into a sequence of corresponding words of a variable length code, for example, a Huffman code.

The inverse quantizer 15 subjects the quantization-resultant picture data to inverse quantization, thereby returning the quantization-resultant picture data to the DCT-coefficient data. The inverse quantizer 15 outputs the DCT-coefficient data to an inverse DCT device 16. The inverse DCT device 16 subjects the DCT-coefficient data to inverse DCT, thereby returning the DCT-coefficient data to the difference picture data (the error picture data). The inverse DCT device 16 outputs the difference picture data to an adder 80. The adder 80 receives the motion-compensated predicted picture data from the motion-compensated predicting device 12. The adder 80 combines the difference picture data and the motion-compensated predicted picture data into data representing a reference picture for motion-compensated prediction. The adder 80 stores the reference picture data into a memory 17. The memory 17 feeds the reference picture data to the motion-compensated predicting device 12. The motion-compensated predicting device 12 implements motion compensation responsive to the reference picture and a present picture represented by the input picture data. The motion-compensated predicting device 12 generates the motion-compensated predicted picture data in response to the input picture data and the reference picture data. The motion-compensated predicting device 12 outputs the motion-compensated predicted picture data to the subtracter 11 and the adder 80.

The input picture data representing an I picture (an intra coded picture) is passed through the subtracter 11 without being processed thereby. On the other hand, the input picture data representing a P picture (a predictive coded picture) or a B picture (a bidirectionally predictive coded picture) is processed by the subtracter 11 as follows. A difference or an error between the input picture data and the motion-compensated predicted picture data is calculated by the subtracter 11. Difference picture data or error picture data representing the calculated difference or error is outputted from the subtracter 11 to the DCT device 13.

The output data from the inverse DCT device 16 which represents an I picture is passed through the adder 80 without being processed thereby. On the other hand, the output data from the inverse DCT device 16 which represents a P picture or a B picture is added to the motion-compensated predicted picture data from the motion-compensated predicting device 12 by the adder 80.

The motion-compensated predicting device 12 generates a signal of motion vectors and a signal of a prediction mode in response to the input picture data and the reference picture data fed from the memory 17. The motion-compensated predicting device 12 outputs the motion-vector signal and the prediction-mode signal to the variable length encoding device 18. The variable length encoding device 18 converts a combination of the quantization-resultant picture data, the motion-vector signal, and the prediction-mode signal into a sequence of corresponding words of the variable length code.

For every block (every MPEG macro block) corresponding to 16 by 16 pixels, the variable length encoding device 18 produces information of the amount (the number of bits) of generated code data. The variable length encoding device 18 outputs the generated code amount information to a block code amount counter 19. The block code amount counter 19 detects the amount of generated code data by a counting process on the generated code amount information. The block code amount counter 19 informs a calculation circuit 20 of the detected code amount. For every block, the calculation circuit 20 computes a code amount accumulation transition from the detected code amount. The calculation circuit 20 outputs information of the computed code amount accumulation transition to a recording circuit 21. For every picture, the calculation circuit 20 computes the amount of generated code data on the basis of the detected code amounts corresponding to the respective blocks. The calculation circuit 20 outputs information of the computed code amount for every picture to the recording circuit 21. The recording circuit 21 records the information of the code amount accumulation transition for every block and the information of the code amount for every picture on a recording medium 22 such as a hard disc, a high-speed storage medium, or a memory.

The recording of the information of the code amount accumulation transition for every block includes a step of normalization such that when the sum (the accumulation) of the code amounts for a picture composed of plural blocks is determined, the sum is regarded as equal to $2^N$ where N denotes a predetermined natural number. The code amounts are normalized in response to $2^N$. Information of the normalization-resultant code amount accumulation transition for every block is recorded. For example, $2^N=2,048$ ($2^{11}$).

The information of the code amount accumulation transition for every block has five bits representing an integer in the range of 0 to 31. The information of the code amount accumulation transition for every block indicates a transition in the result of adding the generated code amounts for the respective blocks in the block encoding order. In the case of a block for which the generated code amount exceeds a value of 31/2048, the generated code amount for the present block is set to 31/2048 and the generated code amount for a next block is set to the sum of the remaining code amount (the surplus code amount) for the present block and the generated code amount for the next block.

In more detail, the calculation circuit 20 computes a differential (difference) code amount accumulation transition for each of blocks composing a picture. In addition, the calculation circuit 20 computes the amount of generated code data for the picture. Information of the differential code amount accumulation transition for each of blocks composing a picture, and information of the amount of the generated code data for the picture are recorded in a format shown in FIG. 3. Specifically, 12-bit information of the amount of the generated code data for a picture is recorded, and then 5-bit information pieces of the differential code amount accumulation transitions for blocks "0", "1", "2", . . . , "1349" composing the picture are sequentially recorded.

The second path of the video signal encoding apparatus will be explained hereinafter with reference to FIG. 2. The rearrangement-resultant digital video signal (that is, the input picture data) is fed to a second encoding circuit "B" via the input terminal 10. In the second encoding circuit "B", the input picture data is applied to a subtracter 11B and a motion-compensated predicting device 12B. The motion-compensated predicting device 12B outputs motion-compensated predicted picture data to the subtracter 11B. The subtracter 11B calculates a difference or an error between the input picture data and the motion-compensated predicted picture data, and generates difference picture data or error picture data representing the calculated difference or error. The subtracter 11B outputs the difference picture data (the error picture data) to a DCT device 13B.

The DCT device 13B subjects the difference picture data to discrete cosine transform (DCT). The DCT device 13B generates DCT-resultant picture data representing DCT coefficients. The DCT device 13B outputs the DCT-coefficient data to a quantizer 14B. The device 14B quantizes the DCT-coefficient data in response to a variable quantization width. The quantization width is equal to a quantization matrix multiplied by a scalar quantization scale. The quantization matrix has 8 by 8 elements resulting from a process of weighting two-dimensional frequency components according to visual sensation. The quantization includes a step of dividing the DCT coefficients by the quantization width. The quantizer 14B outputs the quantization-resultant picture data to a variable length encoding device (a variable length coding device or a VLC device) 18B and an inverse quantizer 15B.

The variable length encoding device 18B converts the quantization-resultant picture data into a sequence of corresponding words of a variable length code, for example, a Huffman code.

The inverse quantizer 15B subjects the quantization-resultant picture data to inverse quantization, thereby returning the quantization-resultant picture data to the DCT-coefficient data. The inverse quantizer 15B outputs the DCT-coefficient data to an inverse DCT device 16B. The inverse DCT device 16B subjects the DCT-coefficient data to inverse DCT, thereby returning the DCT-coefficient data to the difference picture data (the error picture data). The inverse DCT device 16B outputs the difference picture data to an adder 80B. The adder 80B receives the motion-compensated predicted picture data from the motion-compensated predicting device 12B. The adder 80B combines the difference picture data and the motion-compensated predicted picture data into data representing a reference picture for motion-compensated prediction. The adder 80B stores the reference picture data into a memory 17B. The memory 17B feeds the reference picture data to the motion-compensated predicting device 12B. The motion-compensated predicting device 12B implements motion compensation responsive to the reference picture and a present picture represented by the input picture data. The motion-compensated predicting device 12B generates the motion-compensated predicted picture data in response to the input picture data and the reference picture data. The motion-compensated predicting device 12B outputs the motion-compensated predicted picture data to the subtracter 11B and the adder 80B.

The input picture data representing an I picture (an intra coded picture) is passed through the subtracter 11B without being processed thereby. On the other hand, the input picture data representing a P picture (a predictive coded picture) or a B picture (a bidirectionally predictive coded picture) is processed by the subtracter 11B as follows. A difference or an error between the input picture data and the motion-compensated predicted picture data is calculated by the subtracter 11B. Difference picture data or error picture data representing the calculated difference or error is outputted from the subtracter 11B to the DCT device 13B.

The output data from the inverse DCT device 16B which represents an I picture is passed through the adder 80B without being processed thereby. On the other hand, the output data from the inverse DCT device 16B which represents a P picture or a B picture is added to the motion-compensated predicted picture data from the motion-compensated predicting device 12B by the adder 80B.

The motion-compensated predicting device 12B generates a signal of motion vectors and a signal of a prediction mode in response to the input picture data and the reference picture data fed from the memory 17B. The motion-compensated predicting device 12B outputs the motion-vector signal and the prediction-mode signal to the variable length encoding device 18B. The variable length encoding device 18B converts a combination of the quantization-resultant picture data, the motion-vector signal, and the prediction-mode signal into a sequence of corresponding words of the variable length code. The variable length encoding device 18B stores the resultant variable length code data into a buffer memory 27. The variable length code data is outputted from the buffer memory 27 at a fixed rate as an MPEG video stream.

For every block (every MPEG macro block) corresponding to 16 by 16 pixels, the variable length encoding device 18B produces information of the amount (the number of bits) of generated code data. The variable length encoding device 18B outputs the generated code amount information to a block code amount counter 19B. The block code amount counter 19B detects the amount of generated code data by a counting process on the generated code amount information. The block code amount counter 19B informs a control circuit 26 of the detected code amount as an actual code amount "Bits".

The control circuit 26 calculates an error between a target code amount and the actual code amount for every block. The target code amount is given by a target code amount accumulation transition information value. The control circuit 26 is connected to the quantizer 14B. The control circuit 26 adjusts the quantization width in the quantizer 14B in response to the calculated code amount error to implement code amount feedback control.

A reproducing circuit 23 reads out the information of the generated code amount for every picture from the recording medium 22. The reproducing circuit 23 outputs the readout information of the generated code amount for every picture (the first-path picture code amount) to the second encoding circuit "B". In addition, the reproducing circuit 23 reads out the information of the differential code amount accumulation transition for every block from the recording medium 22. The reproducing circuit 23 outputs the readout information of the differential code amount accumulation transition for every block to the second encoding circuit "B".

A decision circuit 24 in the second encoding circuit "B" determines the target amount of code data for every picture regarding the second-path of the video signal encoding apparatus. The character "pass1BIT" denotes the amount of code data representing a picture which is generated in the first path of the video signal encoding apparatus. The decision circuit 24 is informed of the first-path picture code amount "pass1BIT" by the reproducing circuit 23. The character "pass1Q" denotes a mean quantization width for the picture which is used in the first path of the video signal encoding apparatus. The first-path mean quantization width "pass1Q" is equal to the fixed quantization width used in the quantizer 14 within the first encoding circuit "A". The character "pass2BIT" denotes the target amount of code data representing the picture which is generated in the second path of the video signal encoding apparatus. The character "pass2Q" denotes a predicted mean quantization width for the picture which is used in the second path of the video signal encoding apparatus. The first-path picture code amount "pass1BIT", the first-path mean quantization width "pass1Q", the second-path target picture code amount "pass2BIT", and the second-path predicted mean quantization width "pass2Q" are in the following relation.

$$\text{pass2Q}=\text{pass1BIT}\cdot\text{pass1Q}/\text{pass2BIT} \quad (1)$$

The decision circuit 24 determines the second-path target picture code amount "pass2BIT" on the basis of the first-path picture code amount "pass1BIT" by referring to the following equation.

$$\text{pass2BIT}=\text{pass1BIT}\cdot\text{DALL}/\Sigma\text{pass1BIT} \quad (2)$$

where "DALL" denotes a predetermined value or the total amount of data corresponding to the video signal, and "$\Sigma$pass1BIT" denotes the summation of the actual data amounts "pass1BIT" for all the blocks in all the pictures. In addition, the decision circuit 24 determines the second-path predicted mean quantization width "pass2Q" on the basis of the first-path code amount "pass1BIT", the first-path mean quantization width "pass1Q", and the second-path target picture code amount "pass2BIT" according to the equation (1). The decision circuit 24 informs the control circuit 26 of the decided second-path predicted mean quantization width "pass2Q" as an initial quantization width. For the first block of a picture, the control circuit 26 sets the quantization width in the quantizer 14B to the second-path predicted mean quantization width "pass2Q".

A calculation circuit 25 in the second encoding circuit "B" is used in controlling the actual code amount at the target code amount for every picture. The calculation circuit 25 receives the information of the differential code amount accumulation transition for each block from the reproducing circuit 23. The calculation circuit 25 computes a block code amount accumulation transition value on the basis of the information of the differential code amount accumulation transition for each block. The calculation circuit 25 informs the control circuit 26 of the block code amount accumulation transition value.

As previously indicated, the control circuit 26 is informed of the actual code amount by the block code amount counter 19B. The control circuit 26 is informed of the target code amount for every picture by the decision circuit 24. The control circuit 26 is informed of the block code amount accumulation transition value by the calculation circuit 25. For a j-th block, the control circuit 26 calculates the difference (the error) "d(j)" between the actual code amount and the calculated block code amount accumulation value according to the following equation.

$$d(j)=d0+\text{Bits}(j-1)-\{\text{pass2BIT}\cdot\text{trans}(j-1)/2048\} \quad (3)$$

where "Bits(j−1)" denotes the sum of the actual code amounts in the first block to the (j−1)-th block for every picture; "pass2BIT" denotes the target code amount for every picture; "trans (j−1)" denotes the block code amount accumulation transition value in the first block to the (j−1)-th block for every picture which is defined when 2,048 is regarded as corresponding to 100%; and "d0" denotes an initial occupancy of a virtual buffer (a virtual buffer memory). It should be noted that the first block for every picture is numbered as "0". As understood from the equation (3), the error "d(j)" is normalized with 2,048. The control circuit 26 informs the quantizer 14B of the calculated error "d(j)" on a feedback basis. The term "pass2BIT·trans(j−1)/2048" in the equation (3) denotes the block code amount accumulation value (the normalized value) in the first block to the (j−1)-th block for the picture. The term "pass2BIT·trans(j−1)/2048" is equal to the target code amount "pass2BIT" when the block code amount accumulation transition value "trans (j−1)" is equal to 2,048. Thus, the block code amount accumulation value (the normalized value) is normalized by the amount of code data generated for the picture.

For the j-th block, the control circuit 26 calculates the quantization width "Q(j)" from the error "d(j)" according to the following equation.

$$Q(j)=d(j)\cdot 31/r \quad (4)$$

where "r" denotes a parameter deciding the response speed of the feedback. The parameter "r" is given as follows.

$$r=2BR/PR \quad (5)$$

where "BR" denotes a mean target code amount per second, and "PR" denotes the number of frames per second.

For the first block (that is, when j=0), the error "d(0)" is set to the virtual-buffer initial occupation "d0" in connection with the equation (3). By referring to the equation (4), the virtual-buffer initial occupation "d0" is given as follows.

$$d0=Q0\cdot r/31 \quad (6)$$

where "Q0" denotes the predicted mean quantization width "Q(0)" or "pass2Q". For the j-th block, the control circuit 26 sets the actual quantization width (the quantization width used in the quantizer 14B) to the calculated quantization width "Q(j)".

As understood from the previous explanation, the code amount feedback control is responsive to the code amount error for each of blocks composing a picture. Accordingly, the code amount distribution ratio among blocks regarding the second-path of the video signal encoding apparatus can be approximately equal to that regarding the first-path thereof. Thus, the code amount feedback control can follow a picture having a pattern such that the amount of generated code data greatly varies from block to block. In addition, for a block after the block for which the amount of generated code data is significantly great or small, the quantization width used in the quantizer 14B can be prevented from becoming an unduly large value or an unduly small value. Thus, it is possible to provide a high picture quality.

Figure 4:
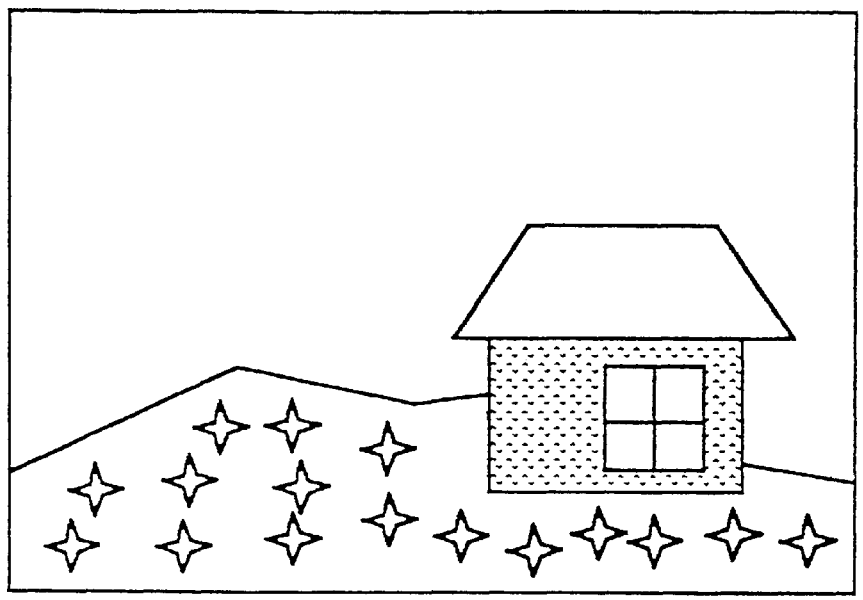
FIG. 4 is a diagram of an example of a picture represented by input picture data.
Figure 5:
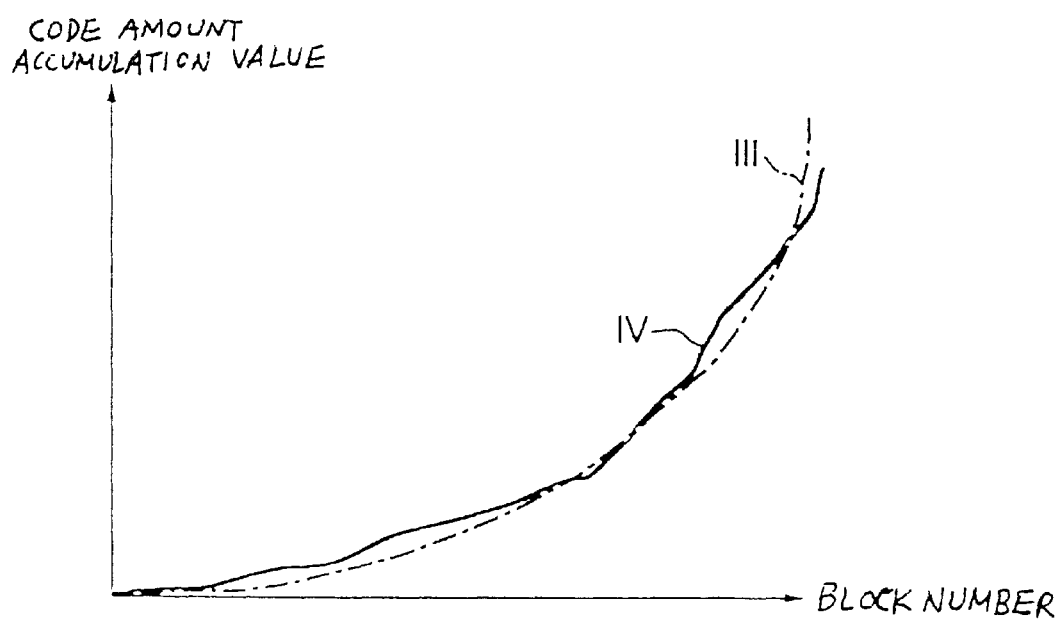
FIG. 5 is a diagram of a relation between a code amount accumulation value and a block number which occurs regarding the picture in FIG. 4.

FIG. 4 shows an example of a picture represented by the input picture data. In the case of the picture of FIG. 4, the accumulation amount of code data generated in the first path of the video signal encoding apparatus transitions along the curve III of FIG. 5. Specifically, the code amount accumulation values for former blocks are relatively small while the code amount accumulation value abruptly increases for blocks near the final block. The accumulation amount of code data actually generated in the second path of the video signal encoding apparatus stably varies along the curve IV of FIG. 5. This means that the quantization width control in the video signal encoding apparatus is stable.

Second Embodiment

A second embodiment of this invention is similar to the first embodiment thereof except for design changes indicated hereinafter.

Figures 3, 6:
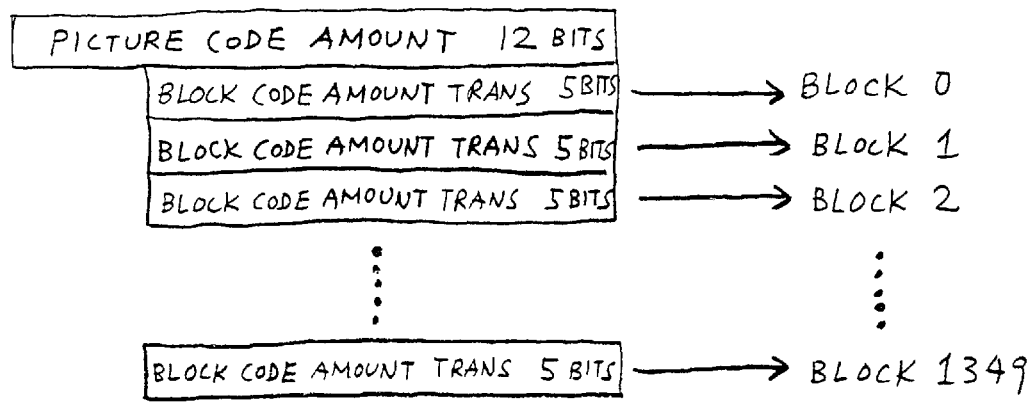
FIG. 3 is a diagram of a format in which various data pieces are recorded on a recording medium in FIGS. 1 and 2.
FIG. 6 is a diagram of a frame composed of blocks separated into a first group and a second group in a video signal encoding apparatus according to a second embodiment of this invention.

Every frame (or every field or every picture) represented by input picture data is divided into a first group of blocks and a second group of blocks. As shown in FIG. 6, the first block group occupies the upper half of the frame while the second block group occupies the lower half thereof. Picture data corresponding to the first block group and picture data corresponding to the second block group are processed in parallel. The character "dij" denotes the difference (the error) between the actual code amount and the calculated block code amount accumulation value for a block whose position corresponds to "ij". Regarding the first block group, the errors "dij" are sequentially calculated in the order as "d00, d01, d02, . . . , d0n, d10, d11, d12, . . . , dm–1n. Regarding the second block group, the errors "dij" are sequentially calculated in the order as "dm0, dm1, dm2, . . . , dmn, d1+m0, d1+m1, d1+m2, . . . , dkn.

Figure 7:
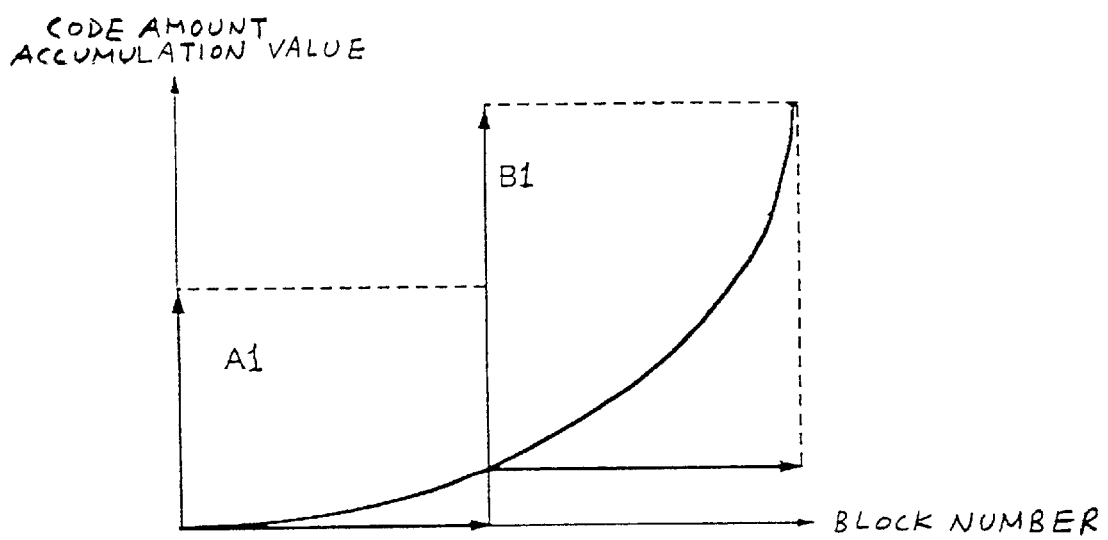
FIG. 7 is a diagram of a relation between a code amount accumulation value and a block number.

FIG. 7 shows an example of the relation between a code amount accumulation value and a processed block number (that is, the number of processed blocks). The code amount accumulation value is based on the result of signal processing in the first path of a video signal encoding apparatus. There are divided coordinated systems "A1" and "B1" which correspond to the fist block group and the second block group respectively. The first error "d00" regarding the first block group is defined relative to an initial value "0". Also, the first error "dm0" regarding the second block group is defined relative to the initial value "0".

Figure 8:
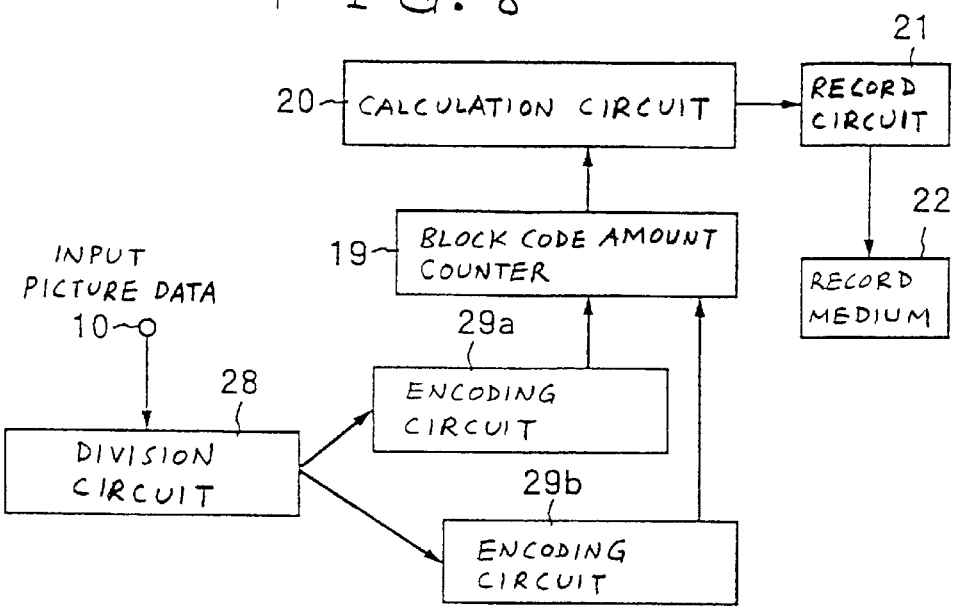
FIG. 8 is a block diagram of a first path of the video signal encoding apparatus according to the second embodiment of this invention.

FIG. 8 shows the first path of the video signal encoding apparatus. With reference to FIG. 8, input picture data is fed via an input terminal 10 to a division circuit 28. The division circuit 28 separates the input picture data into first division-resultant picture data and second division-resultant picture data which correspond to the first block group and the second block group respectively. The division circuit 28 outputs the first division-resultant picture data and the second division-resultant picture data to encoding circuits 29a and 29b respectively. The encoding circuits 29a and 29b process the first division-resultant picture data and the second division-resultant picture data on a parallel basis. The encoding circuits 29a and 29b are similar to a portion of the first encoding circuit "A" in FIG. 1. In addition, the encoding circuits 29a and 29b are similar to each other.

Figure 9:
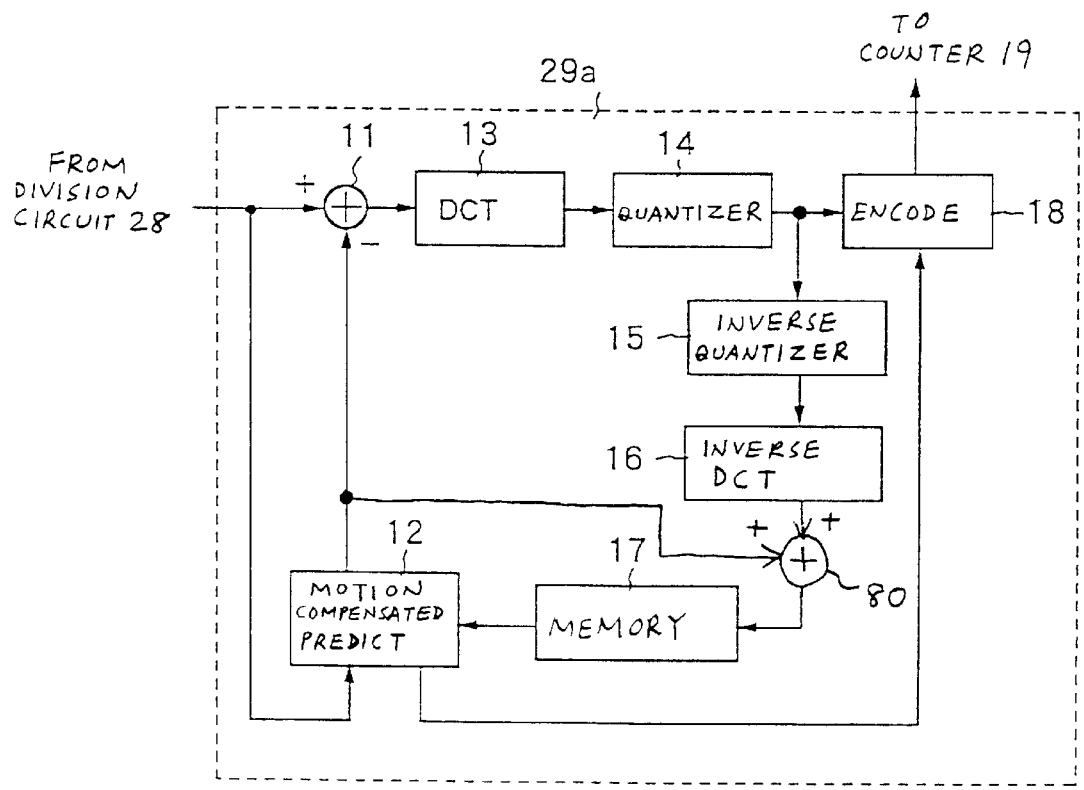
FIG. 9 is a block diagram of an encoding circuit in FIG. 8.

As shown in FIG. 9, the encoding circuit 29a includes a combination of a subtracter 11, a motion-compensated predicting device 12, a DCT device 13, a quantizer 14, an inverse quantizer 15, an inverse DCT device 16, a memory 17, a variable length encoding device 18, and an adder 80.

The encoding circuit 29a outputs information of the amount (the number of bits) of generated code data to a block code amount counter 19. Similarly, the encoding circuit 29b outputs information of the amount (the number of bits) of generated code data to the block code amount counter 19. The block code amount counter 19 detects the amount of generated code data by a counting process on the code amount information outputted from the encoding circuit 29a and the code amount information outputted from the encoding circuit 29b.

Figure 10:
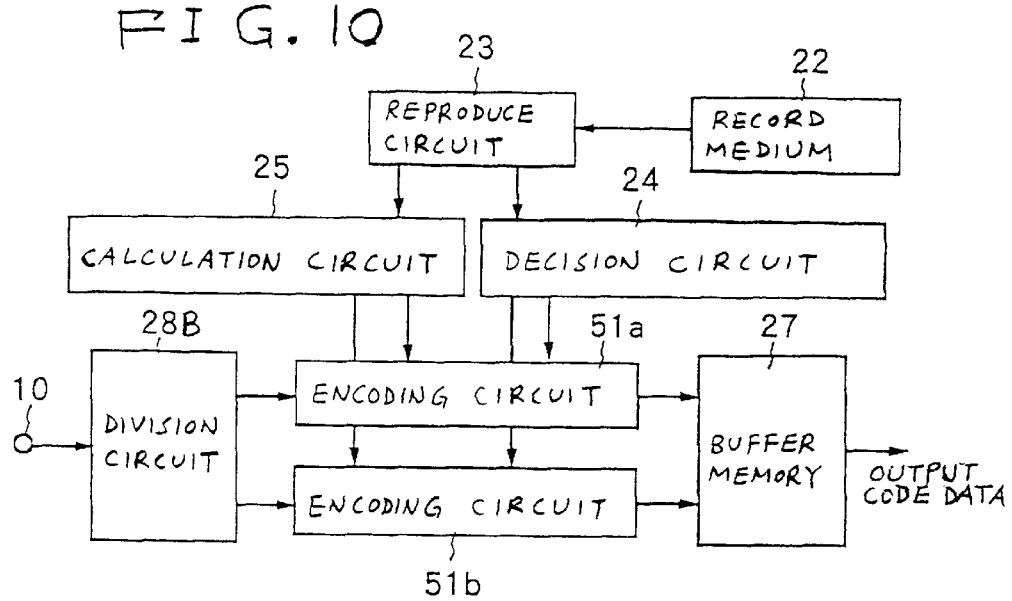
FIG. 10 is a block diagram of a second path of the video signal encoding apparatus according to the second embodiment of this invention.

FIG. 10 shows the second path of the video signal encoding apparatus. With reference to FIG. 10, the input picture data is fed via the input terminal 10 to a division circuit 28B. The division circuit 28B separates the input picture data into first division-resultant picture data and second division-resultant picture data which correspond to the first block group and the second block group respectively. The division circuit 28B outputs the first division-resultant picture data and the second division-resultant picture data to encoding circuits 51a and 51b respectively. The encoding circuits 51a and 51b process the first division-resultant picture data and the second division-resultant picture data into first variable length code data and second variable length code data respectively on a parallel basis. The encoding circuit 51a stores the first variable length code data into a buffer memory 27. The encoding circuit 51b stores the second variable length code data into the buffer memory 27. Segments of the first variable length code data and the second variable length code data are sequentially outputted from the buffer memory 27 in a given scanning order to form an MPEG video stream. The encoding circuits 51a and 51b are connected to a decision circuit 24 and a calculation circuit 25. The encoding circuits 51a and 51b are similar to a portion of the second encoding circuit "B" in FIG. 2. In addition, the encoding circuits 51a and 51b are similar to each other.

Figure 11:
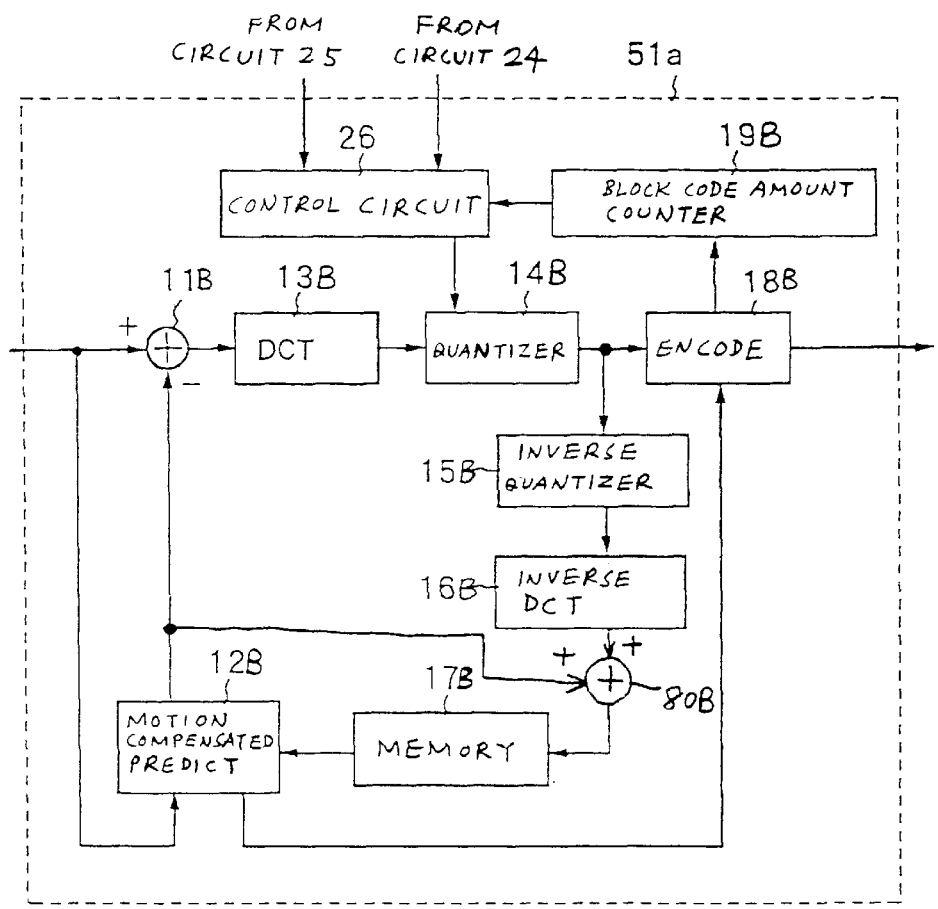
FIG. 11 is a block diagram of an encoding circuit in FIG. 10.

As shown in FIG. 11, the encoding circuit 51a includes a combination of a subtracter 11B, a motion-compensated predicting device 12B, a DCT device 13B, a quantizer 14B, an inverse quantizer 15B, an inverse DCT device 16B, a memory 17B, a variable length encoding device 18B, a block code amount counter 19B, a control circuit 26, and an adder 80B. The control circuit 26 receives picture target code amount information from the decision circuit 24. In addition, the control circuit 26 receives code amount accumulation transition information from the calculation circuit 25.

Regarding each of the encoding circuits 51a and 51b, the code amount feedback control is responsive to the code amount error for each of blocks composing the related half of a picture. The code amount feedback control via the encoding circuit 51a or 51b can follow the related half of a picture which has a pattern such that the amount of generated code data greatly varies from block to block. In addition, for a block after the block for which the amount of generated code data is significantly great or small, the quantization width used in the encoding circuit 51a or 51b can be prevented from becoming an unduly large value or an unduly small value. Thus, it is possible to provide a high quality in both the halves of the picture.

Third Embodiment

A video signal encoding apparatus according to a third embodiment of this invention includes a preceding path and a following path along which an input video signal is transmitted while being processed. The video signal encoding apparatus is designed to implement video signal processing which conforms to the MPEG (Moving Picture Experts Group) standards. Every picture represented by the video signal is divided into blocks. The video signal is processed on a block-by-block basis.

An analog video signal composed of a luminance signal and color difference signals is changed into a corresponding digital video signal by an analog-to-digital converter (not shown). Frame-corresponding time segments or field-corresponding time segments of the digital video signal are rearranged according to the types of pictures represented by the signal segments. The rearrangement-resultant digital video signal is transmitted along the preceding path and the following path of the video signal encoding apparatus while being processed. The timing of processing the rearrangement-resultant digital video signal in the preceding path of the video signal encoding apparatus precedes the timing of processing the rearrangement-resultant digital video signal in the following path thereof by a predetermined time interval corresponding to, for example, 1 GOP (group of pictures). The processing of each time segment of the rearrangement-resultant digital video signal in the following path of the video signal encoding apparatus is responsive to the results of the processing of the same signal time segment in the preceding path thereof.

Figure 12:
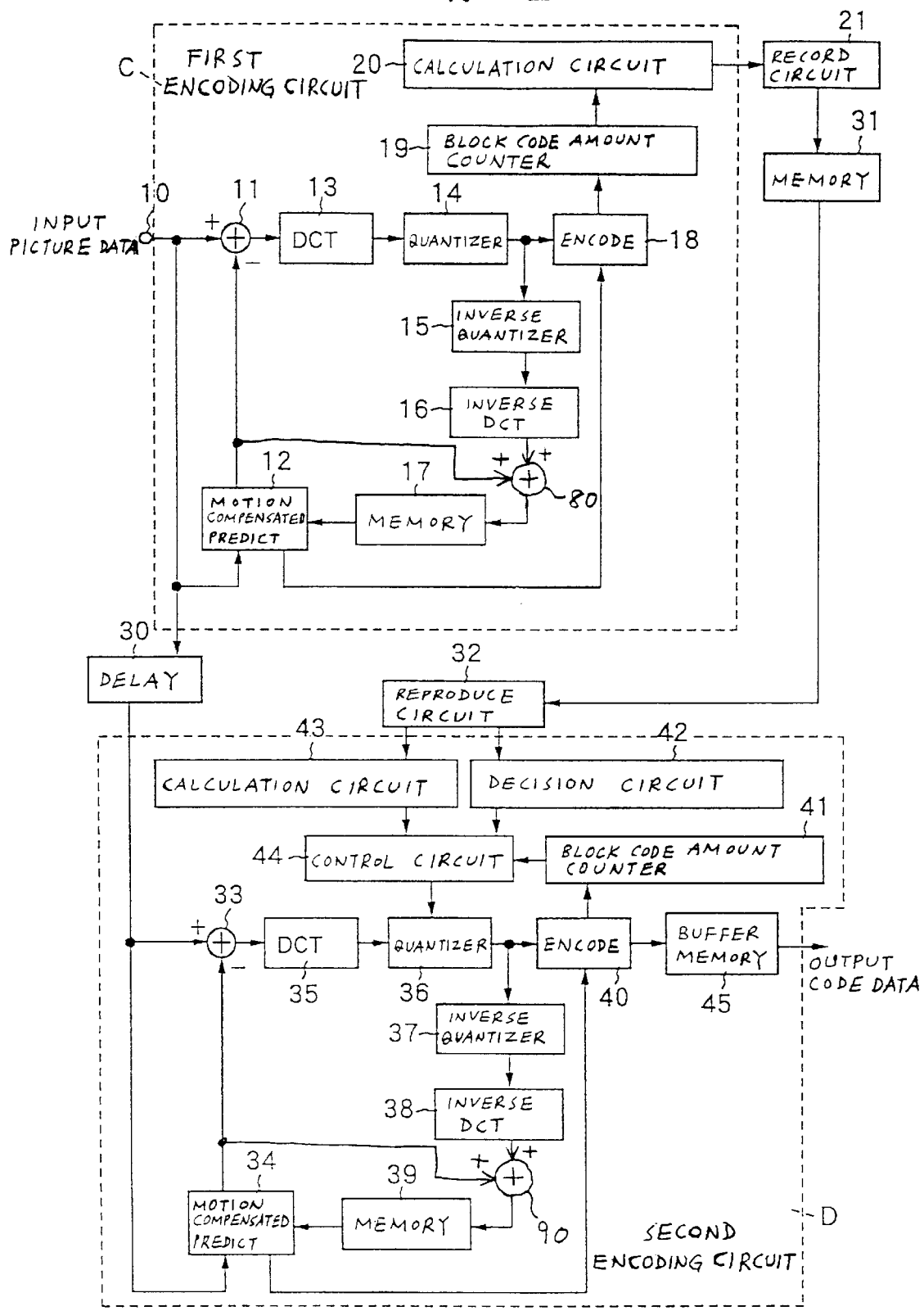
FIG. 12 is a block diagram of a video signal encoding apparatus according to a third embodiment of this invention.

With reference to FIG. 12, a first encoding circuit "C" is contained in the preceding path of the video signal encoding apparatus while a second encoding circuit D is contained in the following path thereof.

The rearrangement-resultant digital video signal is fed, as input picture data, to the first encoding circuit "C" via an input terminal 10. The first encoding circuit "C" is similar in structure to the first encoding circuit "A" in FIG. 1. As shown in FIG. 12, the first encoding circuit "C" includes a combination of a subtracter 11, a motion-compensated predicting device 12, a DCT device 13, a quantizer 14, an inverse quantizer 15, an inverse DCT device 16, a memory 17, a variable length encoding device 18, a block code amount counter 19, a calculation circuit 20, and an adder 80.

In the first encoding circuit "C", the input picture data is applied to the subtracter 11 and the motion-compensated predicting device 12. The device 14 quantizes DCT-coefficient data in response to a fixed quantization width. For every block, the block code amount counter 19 detects the amount of generated code data by a counting process on the generated code amount information fed from the variable length encoding device 18. For every block, the calculation circuit 20 computes a code amount accumulation transition from the detected code amount reported by the block code amount counter 19. The calculation circuit 20 outputs information of the computed code amount accumulation transition to a recording circuit 21. For every picture, the calculation circuit 20 computes the amount of generated code data on the basis of the detected code amount reported by the block code amount counter 19. The calculation circuit 20 outputs information of the computed code amount for every picture to the recording circuit 21. The recording circuit 21 records the information of the code amount accumulation transition for every block and the information of the code amount for every picture on a memory 31.

Also, the input picture data is fed to a delay circuit 30 via the input terminal 10. The delay circuit 30 defers the input picture data by a predetermined time interval corresponding to, for example, 1 GOP, 15 frames, or 3 frames. The delay circuit 30 outputs the delay-resultant picture data to the second encoding circuit "D".

The second path of the video signal encoding apparatus will be explained hereinafter. In the second encoding circuit "D", the delay-resultant picture data is applied to a subtracter 33 and a motion-compensated predicting device 34. The motion-compensated predicting device 34 outputs motion-compensated predicted picture data to the subtracter 33. The subtracter 33 calculates a difference or an error between the delay-resultant picture data and the motion-compensated predicted picture data, and generates difference picture data or error picture data representing the calculated difference or error. The subtracter 33 outputs the difference picture data (the error picture data) to a DCT device 35.

The DCT device 35 subjects the difference picture data to discrete cosine transform (DCT). The DCT device 35 generates DCT-resultant picture data representing DCT coefficients. The DCT device 35 outputs the DCT-coefficient data to a quantizer 36. The device 36 quantizes the DCT-coefficient data in response to a variable quantization width. The quantizer 36 outputs the quantization-resultant picture data to a variable length encoding device (a variable length coding device or a VLC device) 40 and an inverse quantizer 37.

The variable length encoding device 40 converts the quantization-resultant picture data into a sequence of corresponding words of a variable length code, for example, a Huffman code.

The inverse quantizer 37 subjects the quantization-resultant picture data to inverse quantization, thereby returning the quantization-resultant picture data to the DCT-coefficient data. The inverse quantizer 37 outputs the DCT-coefficient data to an inverse DCT device 38. The inverse DCT device 38 subjects the DCT-coefficient data to inverse DCT, thereby returning the DCT-coefficient data to the difference picture data (the error picture data). The inverse DCT device 38 outputs the difference picture data to an adder 90. The adder 90 receives the motion-compensated predicted picture data from the motion-compensated predicting device 34. The adder 90 combines the difference picture data and the motion-compensated predicted picture data into data representing a reference picture for motion-compensated prediction. The adder 90 stores the reference picture data into a memory 39. The memory 39 feeds the reference picture data to the motion-compensated predicting device 34. The motion-compensated predicting device 34 implements motion compensation responsive to the reference picture and a present picture represented by the output data from the delay circuit 30. The motion-compensated predicting device 34 generates the motion-compensated predicted picture data in response to the output data from the delay circuit 30 and the reference picture data from the memory 39. The motion-compensated predicting device 34 outputs the motion-compensated predicted picture data to the subtracter 33 and the adder 90.

The output data from the delay circuit 30 which represents an I picture (an intra coded picture) is passed through the subtracter 33 without being processed thereby. On the other hand, the output data from the delay circuit 30 which represents a P picture (a predictive coded picture) or a B picture (a bidirectionally predictive coded picture) is processed by the subtracter 33 as follows. A difference or an error between the output picture data from the delay circuit 30 and the motion-compensated predicted picture data is calculated by the subtracter 33. Difference picture data or error picture data representing the calculated difference or error is outputted from the subtracter 33 to the DCT device 35.

The output data from the inverse DCT device 38 which represents an I picture is passed through the adder 90 without being processed thereby. On the other hand, the output data from the inverse DCT device 38 which represents a P picture or a B picture is added to the motion-compensated predicted picture data from the motion-compensated predicting device 34 by the adder 90.

The motion-compensated predicting device 34 generates a signal of motion vectors and a signal of a prediction mode in response to the output data from the delay circuit 30 and the reference picture data from the memory 39. The motion-compensated predicting device 34 outputs the motion-vector signal and the prediction-mode signal to the variable length encoding device 40. The variable length encoding device 40 converts a combination of the quantization-resultant picture data, the motion-vector signal, and the prediction-mode signal into a sequence of corresponding words of the variable length code. The variable length encoding device 40 stores the resultant variable length code data into a buffer memory 45. The variable length code data is outputted from the buffer memory 45 at a fixed rate as an MPEG video stream.

For every block (every MPEG macro block) corresponding to 16 by 16 pixels, the variable length encoding device 40 produces information of the amount (the number of bits) of generated code data. The variable length encoding device 40 outputs the generated code amount information to a block code amount counter 41. The block code amount counter 41 detects the amount of generated code data by a counting process on the generated code amount information. The block code amount counter 41 informs a control circuit 44 of the detected code amount as an actual code amount "Bits".

The control circuit 44 calculates an error between a target code amount and the actual code amount. The target code amount is given by a target code amount accumulation transition information value. The control circuit 44 is connected to the quantizer 36. The control circuit 44 adjusts the quantization width in the quantizer 36 in response to the calculated code amount error to implement code amount control.

A reproducing circuit 32 reads out the information of the generated code amount for every picture from the memory 31. The reproducing circuit 32 outputs the readout information of the generated code amount for every picture (the preceding-path picture code amount) to the second encoding circuit "D". In addition, the reproducing circuit 32 reads out the information of the differential code amount accumulation transition for every block from the memory 31. The reproducing circuit 32 outputs the readout information of the differential code amount accumulation transition for every block to the second encoding circuit "D".

A decision circuit 42 in the second encoding circuit "D" is informed of the preceding-path picture code amount "pass1BIT" by the reproducing circuit 32. The decision circuit 42 determines a following-path target picture code amount "pass2BIT" on the basis of the preceding-path picture code amount "pass1BIT" in a suitable way. In addition, the decision circuit 42 determines a following-path predicted mean quantization width "pass2Q" on the basis of the preceding-path picture code amount "pass1BIT", a preceding-path mean quantization width "pass1Q", and the following-path target picture code amount "pass2BIT" according to the equation (1). It should be noted that the preceding-path mean quantization width "pass1Q" is equal to the fixed quantization width used in the quantizer 14 within the first encoding circuit "C". The decision circuit 42 informs the control circuit 44 of the decided following-path predicted mean quantization width "pass2Q" as an initial quantization width. For the first block of a picture, the control circuit 44 sets the quantization width in the quantizer 36 to the second-path predicted mean quantization width "pass2Q".

A calculation circuit 43 in the second encoding circuit "D" is used in controlling the actual code amount at the target code amount for every picture. The calculation circuit 43 receives the information of the differential code amount accumulation transition for each block from the reproducing circuit 32. The calculation circuit 43 computes a block code amount accumulation transition value on the basis of the information of the differential code amount accumulation transition for each block. The calculation circuit 43 informs the control circuit 44 of the block code amount accumulation transition value.

As previously indicated, the control circuit 44 is informed of the actual code amount by the block code amount counter 41. The control circuit 44 is informed of the target code amount for every picture by the decision circuit 42. The control circuit 44 is informed of the block code amount accumulation transition value by the calculation circuit 43. For a j-th block, the control circuit 44 calculates the difference (the error) "d(j)" between the actual code amount and the calculated block code amount accumulation value according to the previously-indicated equation (3). The control circuit 44 informs the quantizer 36 of the calculated error "d(j)" on a feedback basis. For the j-th block, the control circuit 44 calculates the quantization width "Q(j)" from the error "d(j)" according to the previously-indicated equations (4) and (5).

For the first block (that is, when j=0), the error "d(0)" is set to the virtual-buffer initial occupation "d0". By referring to the previously-indicated equation (4), the virtual-buffer initial occupation "d0" is given as "d0=Q0·r/31", where "Q0" denotes the predicted mean quantization width "Q(0)" or "pass2Q". For the j-th block, the control circuit 44 sets the actual quantization width (the quantization width used in the quantizer 36) to the calculated quantization width "Q(j)".

As in the first embodiment of this invention, for a block after the block for which the amount of generated code data is significantly great or small, the quantization width used in the quantizer 36 can be prevented from becoming an unduly large value or an unduly small value. Thus, it is possible to provide a high picture quality.

In the case of the input picture data represents a program, the processing of the input picture data by the video signal encoding apparatus is completed in a time interval approximately equal to the play time of the program plus the signal delay time provided by the delay circuit 30.

Fourth Embodiment

Figure 13:
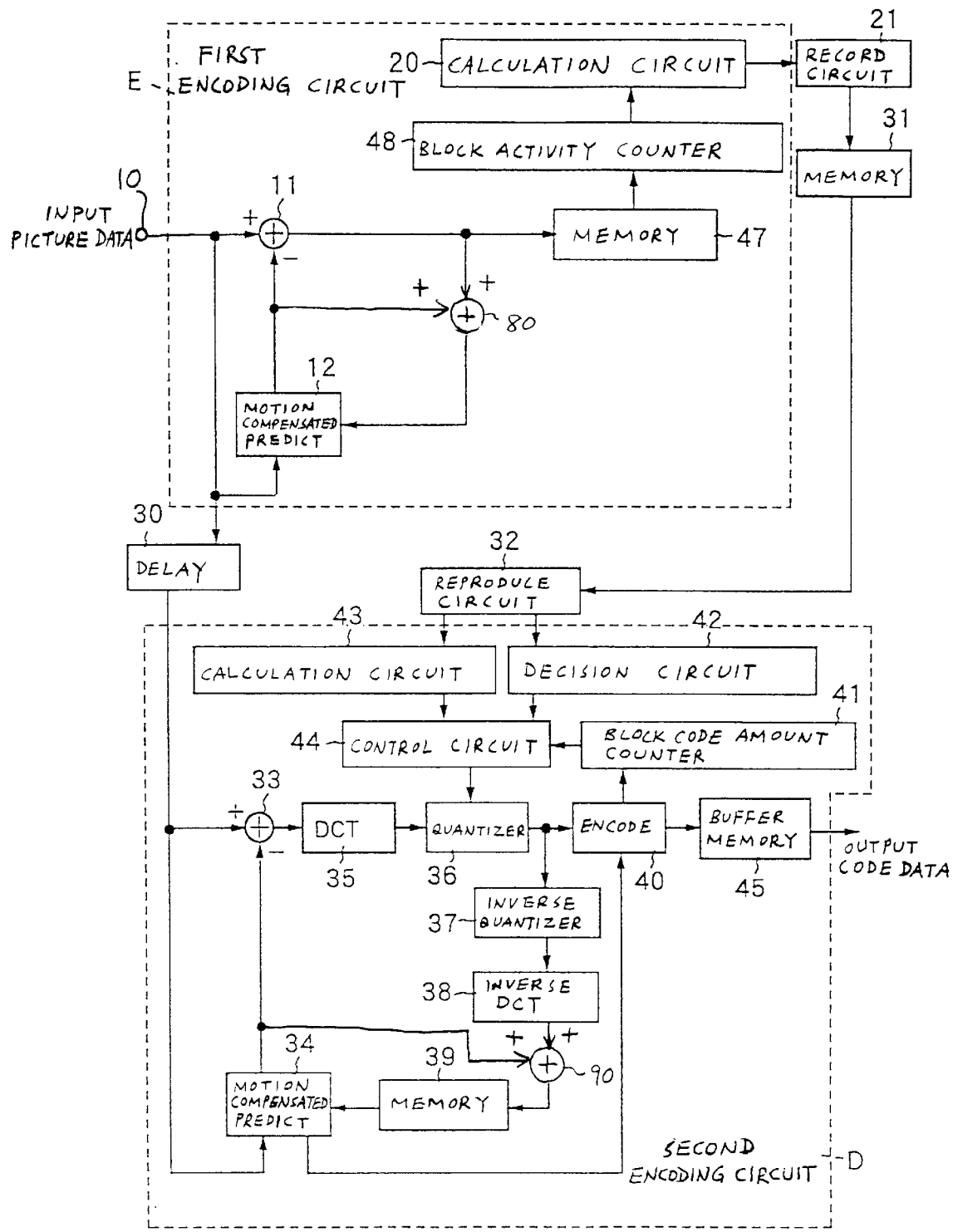
FIG. 13 is a block diagram of a video signal encoding apparatus according to a fourth embodiment of this invention.

FIG. 13 shows a fourth embodiment of this invention which is similar to the embodiment of FIG. 12 except that a first encoding circuit "E" replaces the first encoding circuit "C".

With reference to FIG. 13, rearrangement-resultant digital video signal is fed, as input picture data, to the first encoding circuit "E" via an input terminal 10. In the first encoding circuit "E", the input picture data is applied to a subtracter 11 and a motion-compensated predicting device 12. The motion-compensated predicting device 12 outputs motion-compensated predicted picture data to the subtracter 11. The subtracter 11 calculates a difference or an error between the input picture data and the motion-compensated predicted picture data, and generates difference picture data or error picture data representing the calculated difference or error. The subtracter 11 outputs the difference picture data (the error picture data) to a memory 47 and an adder 80. The output picture data from the subtracter 11 is stored into the memory 47.

The adder 80 receives the motion-compensated predicted picture data from the motion-compensated predicting device 12. The adder 80 combines the difference picture data and the motion-compensated predicted picture data into data representing a reference picture for motion-compensated prediction. The adder 80 outputs the reference picture data to the motion-compensated predicting device 12. The motion-compensated predicting device 12 implements motion compensation responsive to the reference picture and a present picture represented by the input picture data. The motion-compensated predicting device 12 generates the motion-compensated predicted picture data in response to the input picture data and the reference picture data. The motion-compensated predicting device 12 outputs the motion-compensated predicted picture data to the subtracter 11 and the adder 80.

The input picture data representing an I picture (an intra coded picture) is passed through the subtracter 11 without being processed thereby. On the other hand, the input picture data representing a P picture (a predictive coded picture) or a B picture (a bidirectionally predictive coded picture) is processed by the subtracter 11 as follows. A difference or an error between the input picture data and the motion-compensated predicted picture data is calculated by the subtracter 11. Difference picture data or error picture data representing the calculated difference or error is outputted from the subtracter 11 to the memory 47 and the adder 80.

The output data from the subtracter 11 which represents an I picture is passed through the adder 80 without being processed thereby. On the other hand, the output data from the subtracter 11 which represents a P picture or a B picture is added to the motion-compensated predicted picture data from the motion-compensated predicting device 12 by the adder 80.

The difference picture data is fed from the memory 47 to a block activity counter 48. For every block, the block activity counter 48 detects the activity of generated code data by a counting process on the difference picture data. For every block, the activity of generated code data is proportional to the amount of generated code data. The dispersion value of generated code data for a block or the sum of the absolute values represented by the generated code data for a block can be used as the activity. The block activity counter 48 informs a calculation circuit 20 of the detected activity. For every block, the calculation circuit 20 computes a code amount accumulation transition from the detected activity. The calculation circuit 20 outputs information of the computed code amount accumulation transition to a recording circuit 21. For every picture, the calculation circuit 20 computes the amount of generated code data on the basis of the detected activity. The calculation circuit 20 outputs information of the computed code amount for every picture to the recording circuit 21. The recording circuit 21 records the information of the code amount accumulation transition for every block and the information of the code amount for every picture on a memory 31.

Fifth Embodiment

Figure 14:
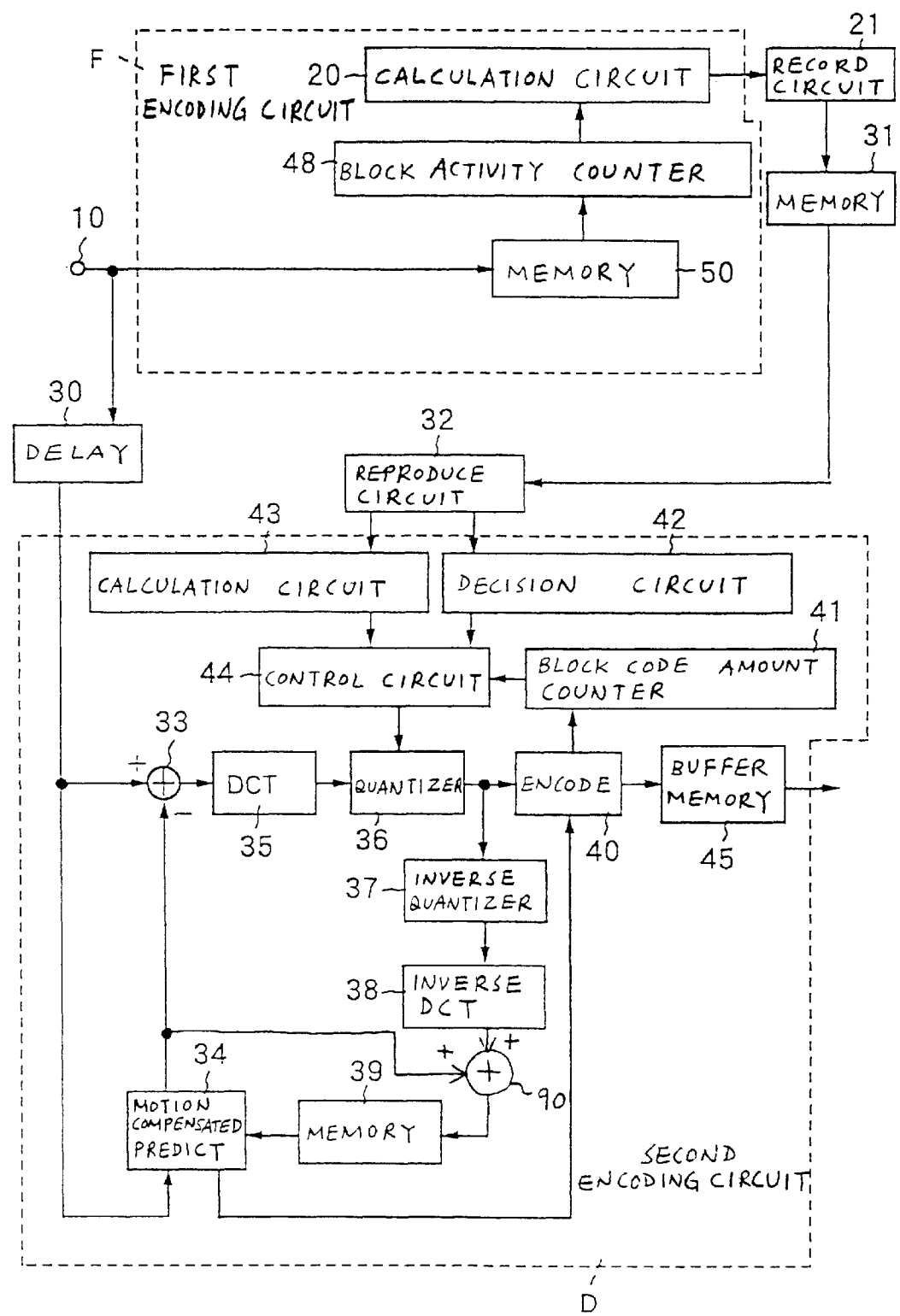
FIG. 14 is a block diagram of a video signal encoding apparatus according to a fifth embodiment of this invention.

FIG. 14 shows a fifth embodiment of this invention which is similar to the embodiment of FIG. 13 except that a first encoding circuit "F" replaces the first encoding circuit "E".

With reference to FIG. 14, rearrangement-resultant digital video signal is fed, as input picture data, to the first encoding circuit "F" via an input terminal 10. In the first encoding circuit "F", the input picture data is applied to a memory 50, being stored thereinto. The picture data is fed from the memory 50 to a block activity counter 48. For every block, the block activity counter 48 detects the activity of generated code data by a counting process on the output picture data from the memory 50. For every block, the activity of generated code data is proportional to the amount of generated code data. The dispersion value of generated code data for a block or the sum of the absolute values represented by the generated code data for a block can be used as the activity. The block activity counter 48 informs a calculation circuit 20 of the detected activity. For every block, the calculation circuit 20 computes a code amount accumulation transition from the detected activity. The calculation circuit 20 outputs information of the computed code amount accumulation transition to a recording circuit 21. For every picture, the calculation circuit 20 computes the amount of generated code data on the basis of the detected activity. The calculation circuit 20 outputs information of the computed code amount for every picture to the recording circuit 21. The recording circuit 21 records the information of the code amount accumulation transition for every block and the information of the code amount for every picture on a memory 31.

Other Embodiments

The embodiment of FIG. 12 may be modified to implement frame division and parallel signal processing as in the embodiment of FIGS. 8–11.

Also, the embodiment of FIG. 13 may be modified to implement frame division and parallel signal processing as in the embodiment of FIGS. 8–11.

Furthermore, the embodiment of FIG. 14 may be modified to implement frame division and parallel signal processing as in the embodiment of FIGS. 8–11.

What is claimed is:

1. An apparatus for encoding first input picture data representing a succession of pictures each composed of plural blocks, the apparatus comprising:

means for detecting an activity of the first input picture data for every block;

means for generating information of an accumulation transition in an amount of a first code data in response to the detected activity for every block;

means for calculating a code amount accumulation transition value from the accumulation transition information and a predetermined target code amount for every block, the predetermined target code amount being defined with respect to every picture;

means for delaying the first input picture data into second input picture data by a predetermined time interval corresponding to a given number of successive pictures;

means for quantizing the second input picture data into second quantization-resultant data in response to a variable quantization width;

means for encoding the second quantization-resultant data into second code data of a variable length code for every block;

means for detecting an actual amount of the second code data for every block;

means for calculating an error between the code amount accumulation transition value and the detected actual amount of the second code data for every block; and means for controlling the variable quantization width in response to the calculated error for every block to maintain an actual amount of the second code data substantially at the target code amount for every picture.

2. An apparatus as recited in claim 1, wherein the accumulation transition information results from normalization with an amount of the first code data for every picture, and includes data of a difference between amounts of the first code data for two successive blocks, and wherein the code amount accumulation transition value is equal to the target code amount multiplied by a value resulting from normalizing a sum of the differences for blocks up to a last processed block with the amount of the first code data for every picture.

* * * * *